Figure 1:
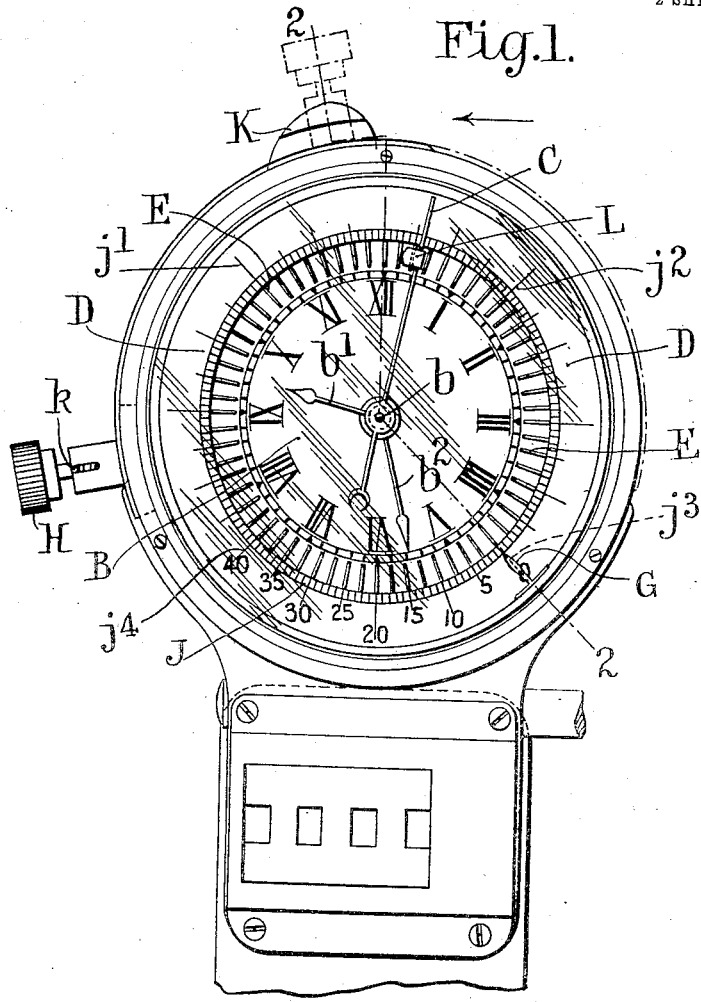

No. 825,075. PATENTED JULY 3, 1906.
R. M. RUCK.
SPEED INDICATOR FOR MOTOR CARS AND OTHER VEHICLES.
APPLICATION FILED NOV. 23, 1905.

2 SHEETS—SHEET 1.

WITNESSES:
W. M. Avery
A. H. Davis

INVENTOR
Richard M. Ruck
BY
ATTORNEYS

No. 825,075.
PATENTED JULY 3, 1906.
R. M. RUCK.
SPEED INDICATOR FOR MOTOR CARS AND OTHER VEHICLES.
APPLICATION FILED NOV. 23, 1905.
2 SHEETS—SHEET 2.
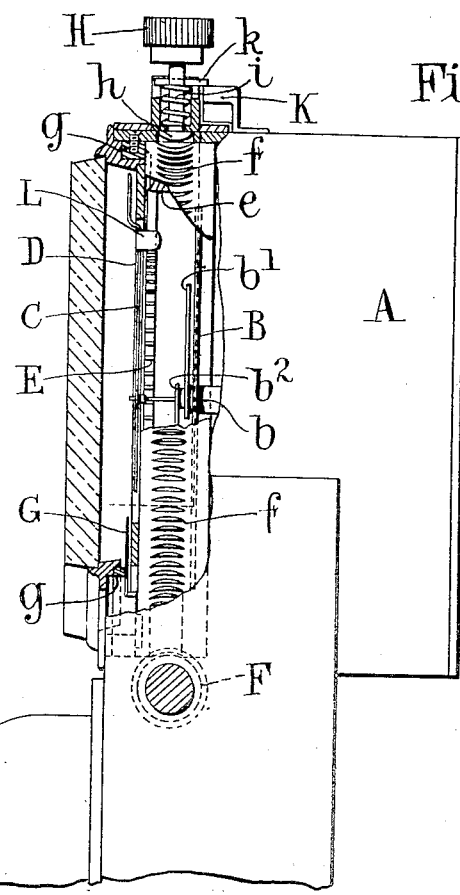
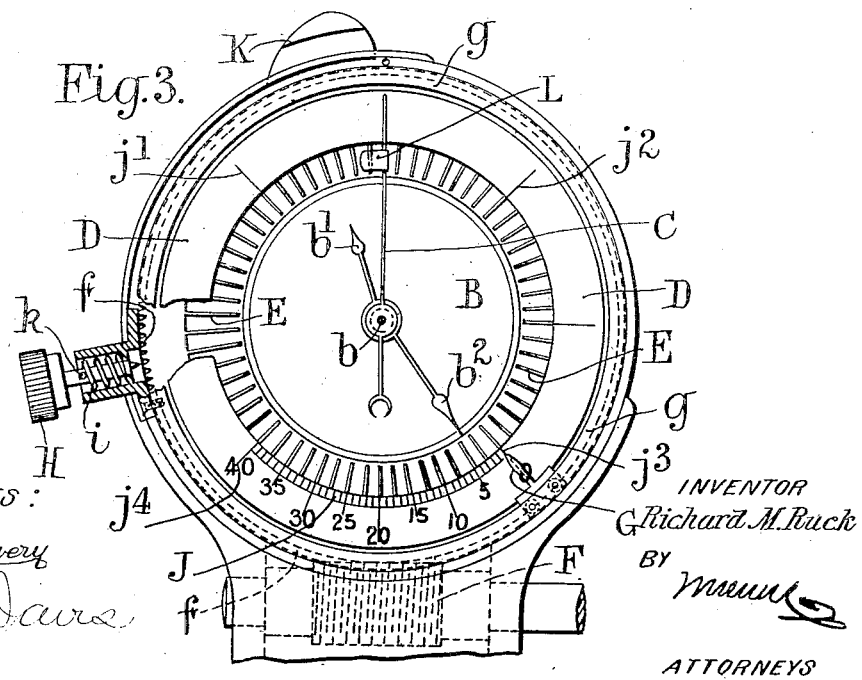
WITNESSES:
W. M. Avery
A. E. Davis
INVENTOR
Richard M. Ruck
BY
[signature]
ATTORNEYS

UNITED STATES PATENT OFFICE.

RICHARD MATTHEWS RUCK, OF LONDON, ENGLAND.

SPEED-INDICATOR FOR MOTOR-CARS AND OTHER VEHICLES.

No. 825,075.  Specification of Letters Patent.  Patented July 3, 1906.

Application filed November 23, 1905. Serial No. 288,715.

*To all whom it may concern:*

Be it known that I, RICHARD MATTHEWS RUCK, brigadier-general, a subject of the King of Great Britain, residing at 44 Thurloe Square, South, Kensington, London, W., England, have invented certain new and useful Improvements in and Relating to Speed-Indicators for Motor-Cars and other Vehicles, of which the following is a specification.

My invention relates to speed-indicators for vehicles, (more particularly motor-cars,) and has for one of its main objects to provide, in connection with the "excess-speed" indicator hereinafter described, means whereby to enable the speed at which the vehicle is at any moment running to be more readily ascertained than heretofore.

The excess-speed indicator above referred to comprises in its preferred form a clock-driven pointer mounted concentrically with and rotating in the same direction as a car-driven index constituted by a series of radial spokes or arms separated by equiangular interspaces, the speed of the car, which bears a constant ratio to that of the spokes, being ascertained by observation of the rate at which said spokes move relatively to the clock-driven pointer, whose velocity is constant and bears a known ratio to the statutory limit of speed for the car. When this limit is exceeded, the spokes overtake or pass the pointer, with the result that an indication of the fact is given by means of a flap pivoted to turn about the arm of the pointer as an axis and adapted to be engaged by the spokes. By contact with the latter the flap is made to incline in the one or the other direction, according as the pointer itself or the spokes has or have the quicker motion, the reversal of the normal inclination of the flap being utilized for the purpose of exhibiting or transmitting a warning of the fact that the statutory or any given limit of speed is exceeded.

According to my invention means are provided for facilitating observation of the speed of the spokes (or their equivalent) relatively to that of the pointer and for enabling the actual rate at which the vehicle is traveling to be read off directly upon a scale in, say, miles per hour. For this purpose there is provided an auxiliary index, which normally rests at the zero-point of a fixed arcual scale mounted concentrically with the clock-driven and car-driven indices, the auxiliary index being movable over said scale and being furnished with means whereby it may be temporarily engaged with the car-driven index, so as to be caused to rotate as one therewith, the angular extent of the scale and of its graduations (which represent, say, miles per hour) being so proportioned to the angular velocity of the clock-driven pointer that the number of graduations traveled over by the auxiliary index while the clock-driven pointer rotates through a predetermined angle will represent the speed at which the vehicle is running.

Figure 4:
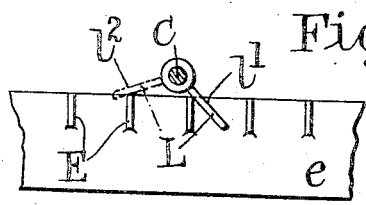

In the accompanying drawings, which illustrate a convenient form of the improved speed-indicator, Figure 1 is a face view of the instrument. Fig. 2 is a section on line 2 2 of Fig. 1. Fig. 3 is a face view, partly in section and with portions removed; and Fig. 4 shows a detail drawn to a larger scale.

Similar letters of reference denote like parts in all the figures.

A is the casing of an apparatus which is adapted to be fixed on the vehicle in a convenient position within sight and reach of the driver, so as to be capable of being manipulated at any moment as required. The casing contains clockwork mechanism, preferably adapted to serve as a timepiece, whereof the hands $b'$ $b^2$ move over an ordinary clock-dial B about an axis $b$. The clock-driven index C consists of a pointer mounted to rotate about the axis $b$ and geared to the clock in substantially the same manner as a "center seconds-hand," so as to perform its revolution at a constant speed bearing a convenient ratio to the statutory limit of speed for the car. The pointer C moves over a stationary dial D, surrounding the clock-dial B, concentrically at a distance outside of and above the latter.

The car-driven index is constituted by an annular series of radially-disposed teeth E, projecting from a circular band $e$, mounted to rotate concentrically with the dial D, the teeth E being preferably presented between the two dials, as indicated. The band $e$ is fitted to turn in an annular bearing in the casing A and is provided with a ring of worm-teeth $f$, whereby it is driven through the medium of a worm F and suitable gearing (not shown) from one of the road-wheels of the vehicle, the ratio between the speed of revolution of the road-wheel and that of the ring of teeth E being such that the latter revolves at the same rate as the clock-driven pointer C when the vehicle is running at the statutory limit of speed.

The auxiliary index whereby the actual speed of the vehicle may at any moment be directly ascertained consists of a pointer G, carried by a band $g$, which is mounted to turn friction-tight upon the casing A, concentrically with the dial D, over which the pointer G extends and relatively to which it is adapted to be caused to move at will as one with the car-driven index E, the band $g$ being, however, allowed only a limited range of angular movement equal to, say, about one-quarter of the whole circle, as indicated. Such limitation may be effected by any convenient arrangement of stop. For the purpose of effecting this movement of the pointer G concurrently with the revolution of the index E the band $g$ is provided with an externally-presented push-piece H on the end of a radially-extending plunger whose inner end $h$ is adapted to engage with the worm-teeth $f$, so that on the push-piece being pressed inward by the finger in opposition to a spring $i$ the band $g$, and consequently the pointer G, will be carried round along with the car-driven index E. The dial D, over which the pointer G is thus movable, is divided circumferentially, as at $j'$, $j^2$, $j^3$, &c., into a number of equiangular main divisions—say four, as in the case illustrated—of which divisions one—say that from $j^3$ to $j^4$—is coterminous with the limited range of travel permitted to the pointer G and is marked with a scale, as at J, graduated to read, say, miles per hour, the graduations being so proportioned to the speed ratio of the car-driven and clock-driven indices E and C that the rate at which the vehicle is traveling will be represented by the position on the scale J reached by the auxiliary index G in the time occupied by the clock-driven pointer C in passing over any one main division of the dial D—as, for example, from $j'$ to $j^2$.

In order that the inner end $h$ of the push-piece H may be automatically thrown out of gear with the worm-teeth $f$ as the pointer G arrives at the end of its travel, so that neither the push-piece nor the worm-teeth may be injured by the hand $g$ overrunning the terminal limit of its movement, a laterally-projecting pin $k$, carried by the push-piece plunger, may be arranged to encounter at the proper moment an inclined cam-surface K on the casing A, so that the push-piece will then be lifted against the pressure of the finger. When not connected to the index E by the engagement of the push-piece H with the worm-teeth $f$, the band $g$ and pointer G are freely movable at will within their limit of travel relatively to the dial D.

To ascertain the speed of the vehicle, the auxiliary index G having first been set back to the zero-point $j^3$ on its scale J, the push-piece H is pressed upon at the moment when the clock-driven pointer C enters any one of the main divisions of the dial D—say that from $j'$ to $j^2$—the pressure being maintained until and released only at the moment when the pointer C leaves said division, whereupon the auxiliary index G (which will meanwhile have been carried along with the car-driven index E) will be found arrested at a point on its scale J marked in accordance with the speed of the vehicle. Hence this speed can be directly read off without calculation, and as there is no necessity to watch the auxiliary index G during its travel, but only the clock-driven pointer C, the operation is performed with the greatest ease and without risk of error.

The flap L, which is pivoted to the clock-driven pointer C, may serve as a means of affording a direct visual indication as to whether the vehicle is running below, at, or above the statutory or other given limit. When so used, the flap L is colored differently on its opposite sides and preferably hangs freely from the pointer C. Hence, assuming the apparatus to be mounted on the steering hand-wheel so that the face of the clock-dial is approximately horizontal, the flap L will so long as the vehicle is running at the given limit of speed hang down between two adjacent teeth of the car-driven index E, neither side of the flap being exposed. When, however, the speed of the car exceeds the said limit, the tooth following the flap L will overtake the latter and cause it to turn about its pivotal connection with the pointer C until its forward side $l'$, (see Fig. 4,) which may be colored red, is presented to view. On the other hand, if the speed of the car should fall below the given limit the flap L would be caused to overtake the next tooth of the index E in advance, with the result that the opposite or rear side $l^2$ of the flap, which may be colored white, would be turned upward. In cases where it is of importance to keep a motor-car running at the maximum permissible rate of speed the use of this means of constantly indicating the positive or negative or neutral condition of the speed ratio is obviously of the greatest utility.

I claim—

1. The combination with a speed-indicator for motor-cars and other vehicles consisting essentially of clock-driven and car-driven indices mounted concentrically with one another and rotated at velocities which are respectively constant and proportional to the speed at which the vehicle is traveling, of an auxiliary index mounted concentrically with said indices and adapted to be temporarily engaged with the car-driven index so as to be caused to move as one therewith, and scales over which the clock-driven and auxiliary indices are respectively movable, and which are so graduated that the amplitude of the movement performed by the auxiliary index while the clock-driven index rotates through a predetermined angle will represent the speed at which the vehicle is traveling substantially as specified.

2. In apparatus of the class described, the combination with clock-driven and car-driven indices, of a flap pivoted to one of said indices and normally lying in the path of the other index, and means connected with said last-named index for swinging the flap to one side when the speed of said indices becomes unequal whereby to indicate the inequality.

3. In apparatus of the class described, the combination with clock-driven and car-driven indices, of means connected with one of said indices for indicating an inequality of speed in the travel of said indices.

4. In apparatus of the class described, the combination with clock-driven and car-driven indices, of a flap pivoted to one of said indices and normally lying in the path of the index, said flap being differently colored upon the opposite sides thereof, and means connected with said last-named index for swinging the flap to one side when the speed of said indices becomes unequal, whereby to indicate the inequality

RICHARD MATTHEWS RUCK.

Witnesses:
GEORGE ERNEST MINTERN,
D'ARCY MELVILLE CLARK.